(12) United States Patent
Kohn et al.

(10) Patent No.: US 8,761,182 B2
(45) Date of Patent: Jun. 24, 2014

(54) TARGETED FLOW SAMPLING

(75) Inventors: Jack Kohn, Mountain View, CA (US); Gunes Aybay, Los Altos, CA (US); Fuguang Shi, Saratoga, CA (US); David Rowell, Mountain View, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 446 days.

(21) Appl. No.: 13/098,445

(22) Filed: Apr. 30, 2011

(65) Prior Publication Data
US 2011/0206049 A1 Aug. 25, 2011

Related U.S. Application Data

(63) Continuation of application No. 12/021,824, filed on Jan. 29, 2008, now Pat. No. 7,957,396.

(51) Int. Cl.
*H04L 12/28* (2006.01)

(52) U.S. Cl.
USPC .................................. 370/395.32

(58) Field of Classification Search
None
See application file for complete search history.

(56) References Cited

U.S. PATENT DOCUMENTS

| 5,390,173 | A | 2/1995 | Spinney et al. |
| 5,920,900 | A | 7/1999 | Poole et al. |
| 6,115,802 | A | 9/2000 | Tock et al. |
| 6,161,144 | A | * 12/2000 | Michels et al. ............ 709/238 |
| 7,002,965 | B1 | 2/2006 | Cheriton |
| 7,031,320 | B2 | 4/2006 | Choe |
| 7,054,855 | B2 | 5/2006 | Basso et al. |
| 7,519,727 | B2 | 4/2009 | Wiryaman et al. |
| 7,633,944 | B1 * | 12/2009 | Chang et al. .................. 370/392 |
| 7,957,396 | B1 * | 6/2011 | Kohn et al. ............. 370/395.32 |
| 2002/0122424 | A1 | 9/2002 | Kawarai et al. |
| 2002/0191598 | A1 | 12/2002 | Mays |
| 2004/0125797 | A1 * | 7/2004 | Raisanen ..................... 370/389 |
| 2005/0044134 | A1 | 2/2005 | Krueger et al. |
| 2007/0289017 | A1 * | 12/2007 | Copeland, III ................. 726/23 |

OTHER PUBLICATIONS

Co-pending U.S. Appl. No. 12/021,824, filed Jan. 29, 2008 entitled "Targeted Flow Sampling" by Jack Kohn et al., 13 pages.

* cited by examiner

*Primary Examiner* — Hassan Kizou
*Assistant Examiner* — Robert A Shand
(74) *Attorney, Agent, or Firm* — Harrity & Harrity, LLP

(57) ABSTRACT

A device may include two or more line interfaces. One of the line interfaces may include a component to buffer a packet that is received at the line interface, perform a lookup of information related to selecting a flow based on a header of the packet, apply a symmetric hash function to addresses in the header to obtain a hash when the information related to selecting the flow indicates the flow is to be selected based on a random method, compare the hash to a particular number using the information related to selecting the flow, the particular number being same for the line interfaces, sample a flow when the hash matches the particular number, create a flow record for the flow, and sample packets based on the flow record.

20 Claims, 13 Drawing Sheets

812⟶ $H(k) = k \bmod 251$
Fig. 8D
814⟶ $H(10771) = 10771 \bmod 251 = 229$
Fig. 8E
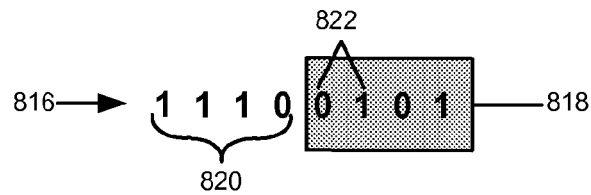
Fig. 8F
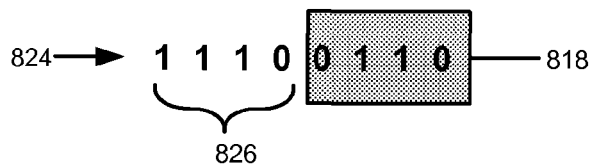
Fig. 8G

TARGETED FLOW SAMPLING

RELATED APPLICATION

This application is a continuation of U.S. patent application Ser. No. 12/021,824, filed Jan. 29, 2008, which is incorporated herein by reference.

BACKGROUND

Network devices, such as switches or routers, may be used not only to route and/or switch packets to their destinations at different network layers, but also to collect information related to clients in the network, applications that are hosted on network devices, and/or traffic in the network.

SUMMARY

A device may include two or more line interfaces. One of the line interfaces may include a component to buffer a packet that is received at the line interface, perform a lookup of information related to selecting a flow based on a header of the packet, apply a symmetric hash function to addresses in the header to obtain a hash when the information related to selecting the flow indicates the flow is to be selected based on a random method, compare the hash to a particular number using the information related to selecting the flow, the particular number being same for the line interfaces, sample a flow when the hash matches the particular number, create a flow record for the flow, and sample packets based on the flow record.

According to one aspect, a device may include a first line interface and a second line interface. The first line interface may be configured to buffer a packet that is received at the line interface, perform a lookup of information related to selecting a flow based on a header of the packet, apply a symmetric hash function to addresses in the header to obtain a hash when the information related to selecting the flow indicates the flow is to be selected based on a random method, compare the hash to a particular number using the information related to selecting the flow, the particular number being same for the first line interface and the second line interface, sample a flow when the hash matches the particular number, create a flow record for the flow; and sample packets based on the flow record.

BRIEF DESCRIPTION OF THE DRAWINGS

The accompanying drawings, which are incorporated in and constitute a part of this specification, illustrate one or more embodiments described herein and, together with the description, explain the embodiments. In the drawings:

FIG. 4 is a functional block diagram of an exemplary line interface of FIG. 2a;

FIG. 8D shows a hash function;

FIG. 8E shows application of the hash function of FIG. 8D to the sorted addresses of FIG. 8C;

FIG. 8F shows a result of the application of the hash function to the sorted addresses of FIG. 8C and masking the result with a bit mask; and FIG. 8G shows masking a bit sequence.

DETAILED DESCRIPTION OF PREFERRED EMBODIMENTS

Figure 1:
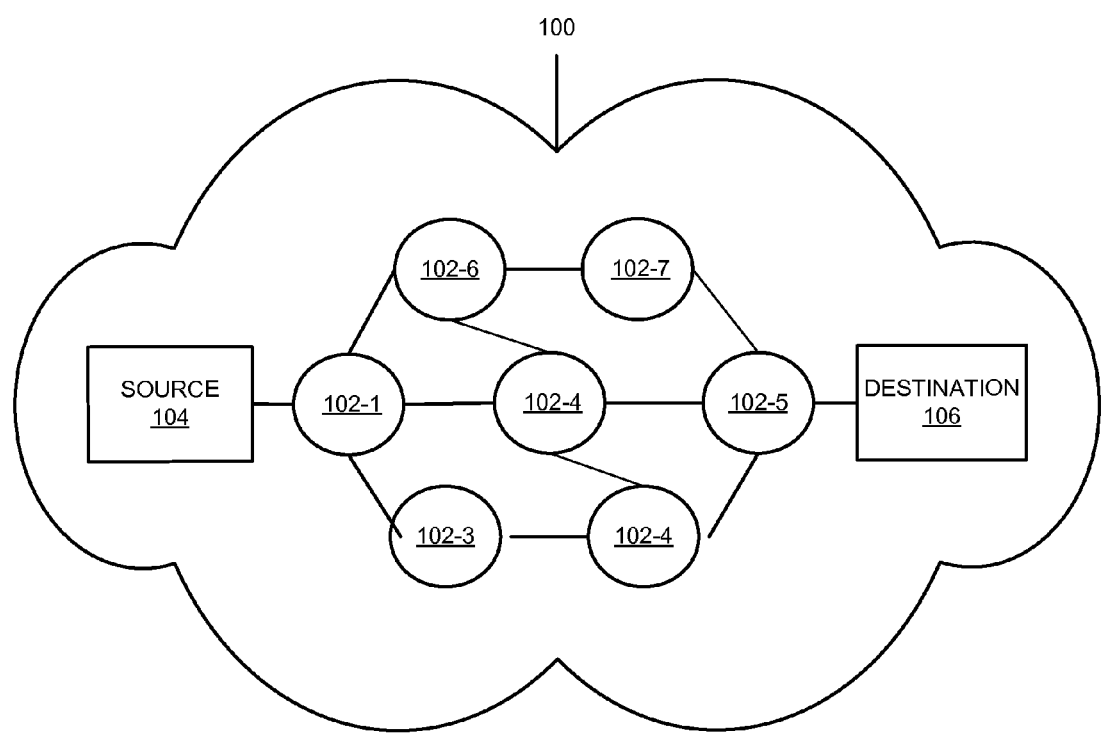
FIG. 1 is a diagram of an exemplary network in which concepts described herein may be implemented.

The following detailed description refers to the accompanying drawings. The same reference numbers in different drawings may identify the same or similar elements.

In the following, a network device may select different streams of packets, known as flows, for sampling packets that belong to the selected flows. When a packet arrives at the network device, the network device may determine whether to select a flow that is associated with the packet based on a packet classification and/or a symmetric hash function. Using the symmetric hash function may allow the network device to randomly select bidirectional flows (e.g., a pair of flows that run in opposite directions) in a manner that accurately reflects overall statistical characteristics of flows in the network device. Selecting a bidirectional flows in lieu of two unrelated flows may increase the probability of obtaining representative sample packets that carry useful information for managing the network.

The term "packet," as used herein, may refer to a packet, datagram, cell; a fragment of a packet, datagram or cell; or other types of data. For example, a packet may refer to an Internet Protocol (IP) packet that has been pre-pended with additional header fields (e.g., packet classification information, addresses, etc.). "Sample" or "sampled packet," as used herein, may refer to a full copy or a partial copy of the packet and/or storing the full/partial copy.

The term "visibility," as used herein, may refer to availability of information/data about one or more packets to users, non-local components, and/or external devices. Furthermore, the term "visibility engine" may refer to a hardware/software component for obtaining the information/data from packets. The information/data may or may not require further processing before the information/data is made available to an application, a device, or a user.

The term "source," as used herein, may refer to a node (e.g., network node, a network socket, etc.) from which packets emerge. The term "destination," used herein, may refer to a node to which the packets are sent. A source or a destination may be a logical network source or destination that is associated with one or more identifiers, such as an IP address, a port number, etc.

The term "flow," as used herein, may refer to a stream of packets from a source to a destination. The term "sampling a flow" may entail selecting the flow, creating a record for the flow selected for sampling (e.g., a flow record), and indicating in the record that packets which belong to the flow are to be sampled. In contrast, sampling a packet may involve obtaining a full or partial copy of the packet, and may be distinguished from sampling a flow. The term "reverse flow," as used herein, may refer to a flow whose source and destination correspond to a destination and a source, respectively, of another flow. For example, if a flow has a source address of 191.201.1.23 and a destination address of 203.42.3.101, its reverse flow may have a source address of 203.42.3.101 and a destination address of 191.201.1.23.

As used herein, the term "bidirectional flow" may refer to a pair of flows, a flow and its reverse flow.

As used herein, the term "flow statistics" may refer to information about a given flow, such as a byte count, a number of packets, a start time, etc. associated with the flow.

As used herein, the term "symmetric hash function" may refer to a hash function that maps a first input value and a second input value to the same hash, where the second input value is derived from the first input value by swapping one portions of the first input value with another portion of the first input value. For example, if a hash function maps "XY" and "YX," to the same hash, the hash function may be a symmetric hash function with respect to X and Y. A hash to which the symmetric hash function maps an input value may be referred to as a "symmetric hash."

FIG. 1 illustrates a network 100 according to an exemplary embodiment. Network 100 may include the Internet, an ad hoc network a local area network (LAN), a wide area network (WAN), a metropolitan area network (MAN), a cellular network, a public switched telephone network (PSTN), any other network, or a combination of one or more networks.

As shown, network 100 may include any number of network devices for routing packets through network 100, with multiple network devices 102-1 through 102-7 (generically and individually referred to herein as a "network device 102-$x$") shown in FIG. 1 by way of example. Each network device 102-$x$ may include, for example, a router, a switch, or a gateway, that routes or switches incoming packets towards one or more destinations.

As further shown in FIG. 1, network 100 may include a source node 104 and a destination node 106 interconnected via network devices 102. Source node 104 and destination node 106 may each include, for example, a host or a server. Source node 104 and destination node 106 may connect with devices in network 100 via wired, wireless or optical connection links. Packets that originate at source node 104 may be routed to destination node 106 via network devices 102.

The number and configuration of network devices 102 depicted in FIG. 1 are for illustrative purposes only. A network may include different, more or fewer network devices than are illustrated in FIG. 1. Additionally, only a single source node 104 and destination node 106 have been shown in FIG. 1 for purposes of simplicity. However, multiple sources nodes and destination nodes may be coupled to network devices 102.

Figure 2A:
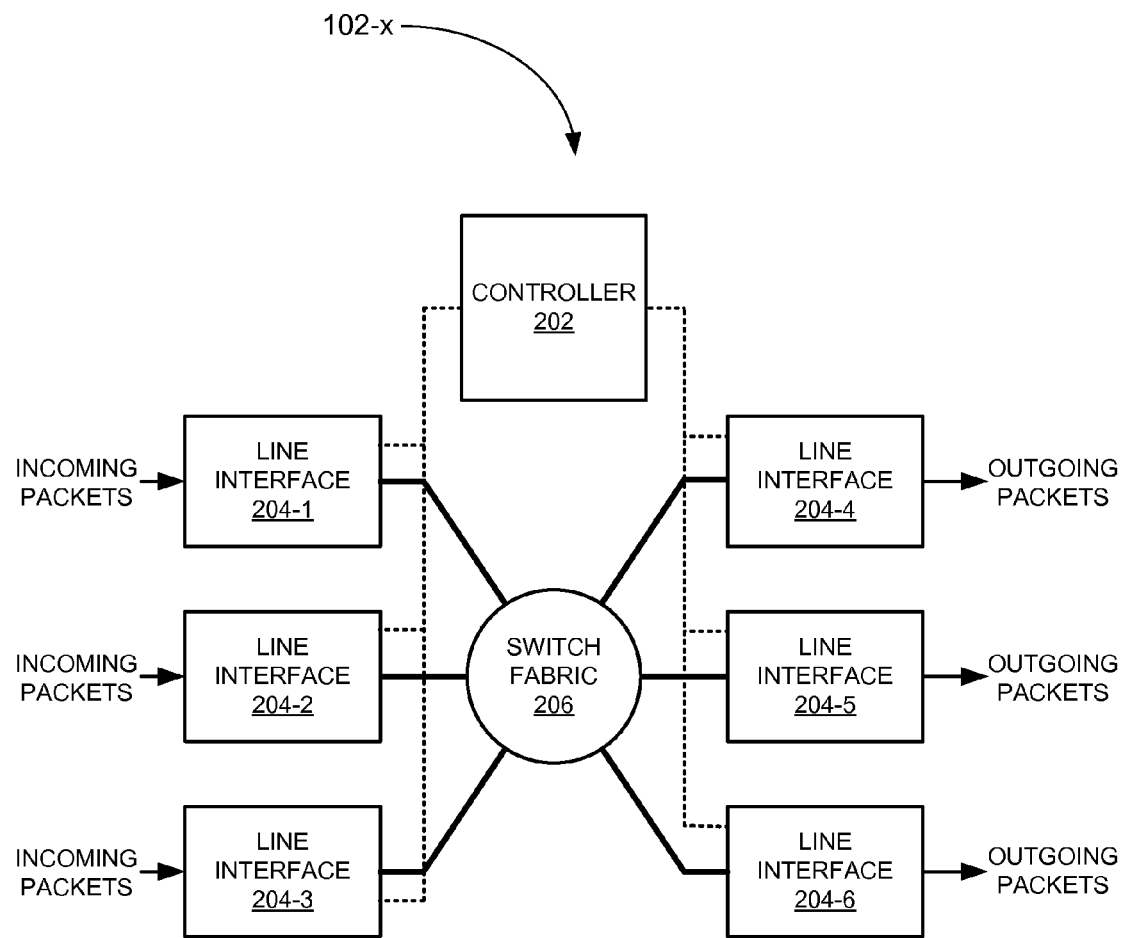
FIG. 2A is a diagram of a network device of FIG. 1 according to an exemplary implementation.

FIG. 2A illustrates a network device 102-$x$ according to an exemplary implementation. Network device 102-$x$ may receive one or more packets from one or more physical links, process the packets to determine their destinations, and transmit the packets on one or more links in accordance with the determined destinations or one or more other properties of the packets.

As shown in FIG. 2A, network device 102-$x$ may include a controller 202, line interfaces 204-1 through 204-6 (herein collectively referred to as "line interfaces 204" and generically and individually referred to as a "line interface 204-$x$"), and a switch fabric 206. Controller 202 may include components for managing routes, flow statistics, and/or types of information that may require centralized processing. Controller 202 may manage routes (e.g., accept or disseminate routes to other network devices 102) in accordance with routing/signaling protocols. In addition, controller 202 may receive and process flow statistics and/or packet samples from other components of network device 102-$x$ (e.g., line interfaces 204).

Line interfaces 204 may include components for receiving packets from devices or components in network 100 and for transmitting the packets to other devices in network 100. In addition, each of line interfaces 204 may perform packet forwarding, packet classification, internal redirection of packets to other components in network device 102-$x$, management of a flow table, and sampling flows. Switch fabric 206 may include switches for conveying packets from line interfaces 204 or other modules (not shown) to line interfaces 204 or the other modules.

Network device 102-$x$ may include fewer, additional and/or different components than are shown in FIG. 2A. For example, network device 102-$x$ may include additional or fewer line interfaces or additional controllers. In another example, network device 102-$x$ may include one or more service modules (not shown) that are connected to switch fabric 206 and perform various network services. For example, network device 102-$x$ may include a firewall service module, an intrusion detection service module, an encryption/decryption service module, or other types of service modules.

Figure 2B:
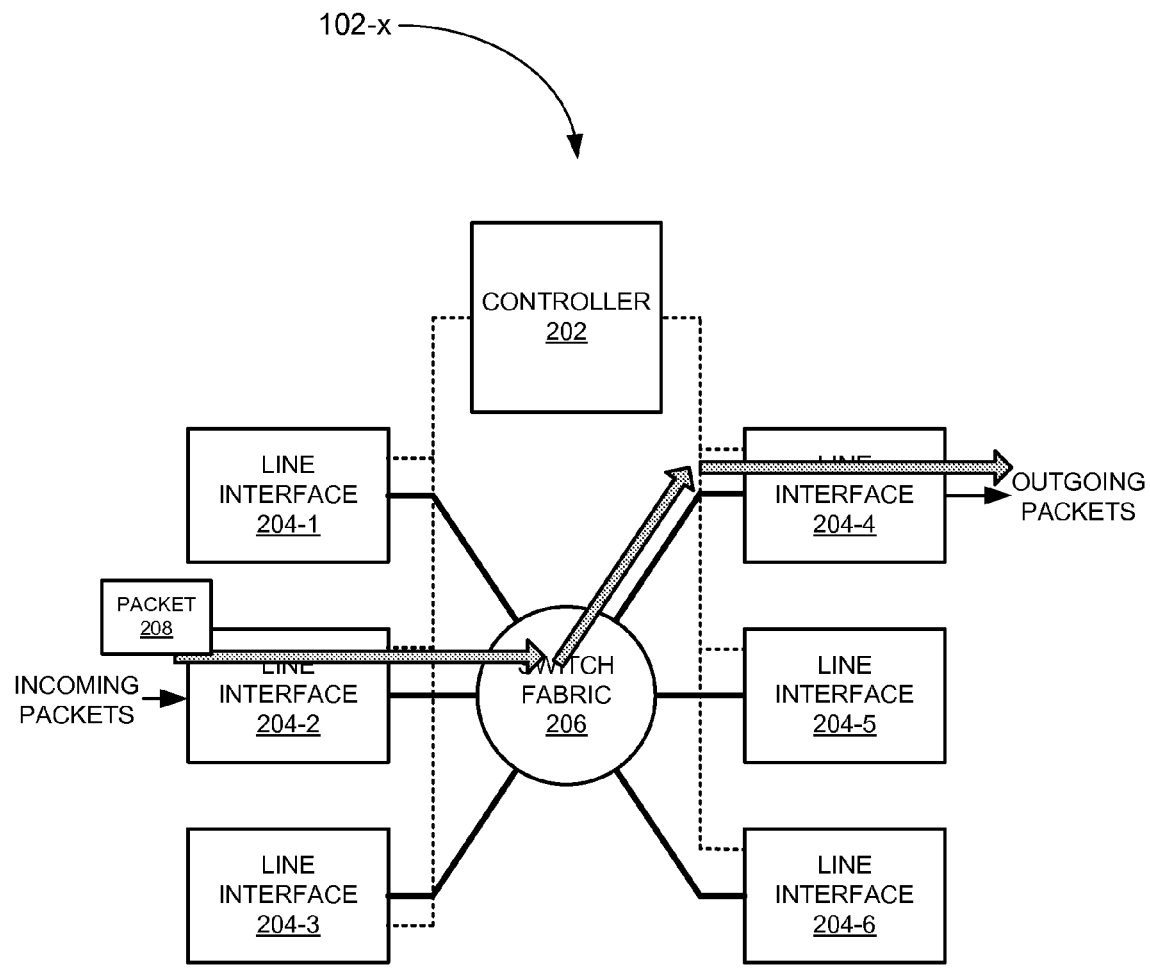
FIGS. 2B, 2C and 2D are diagrams of exemplary paths packets may take when traversing the exemplary network device of FIG. 2A.
Figure 2C:
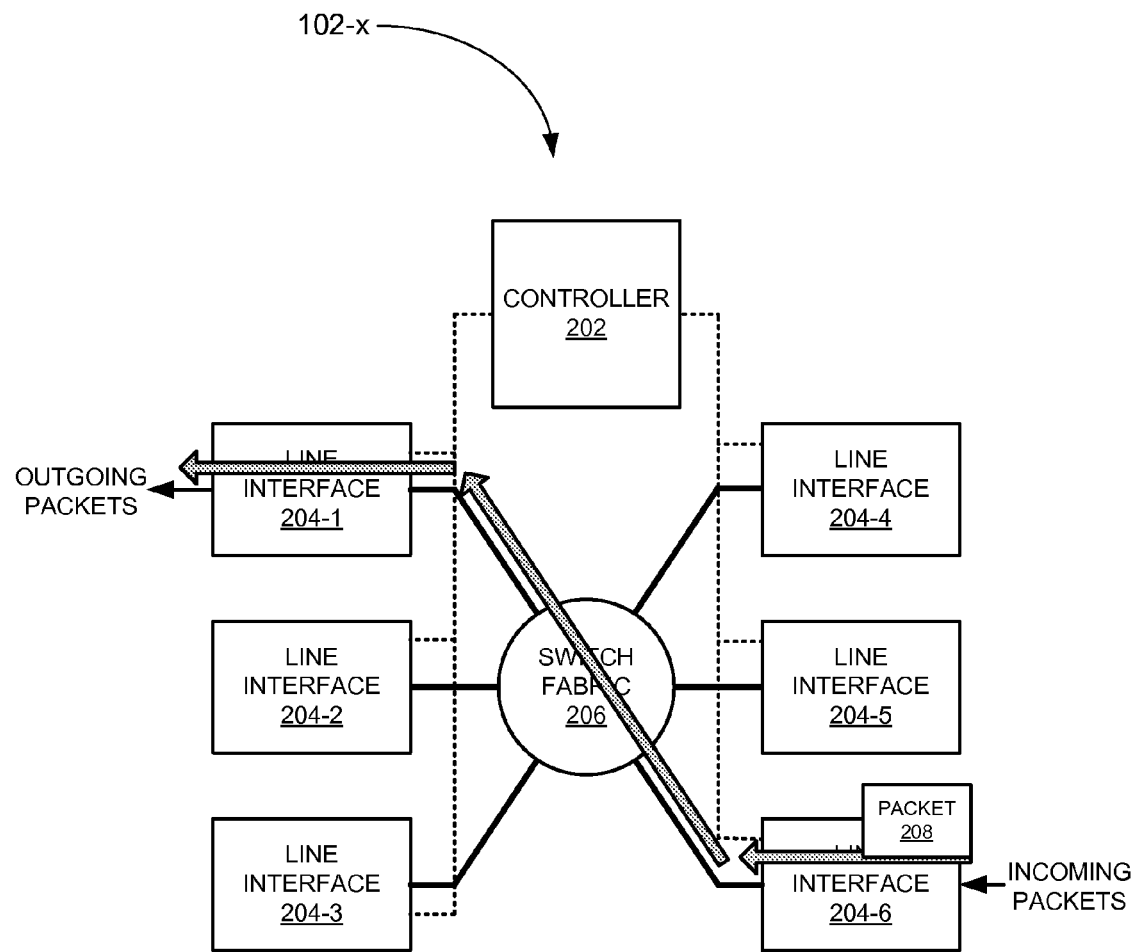
Figure 2D:
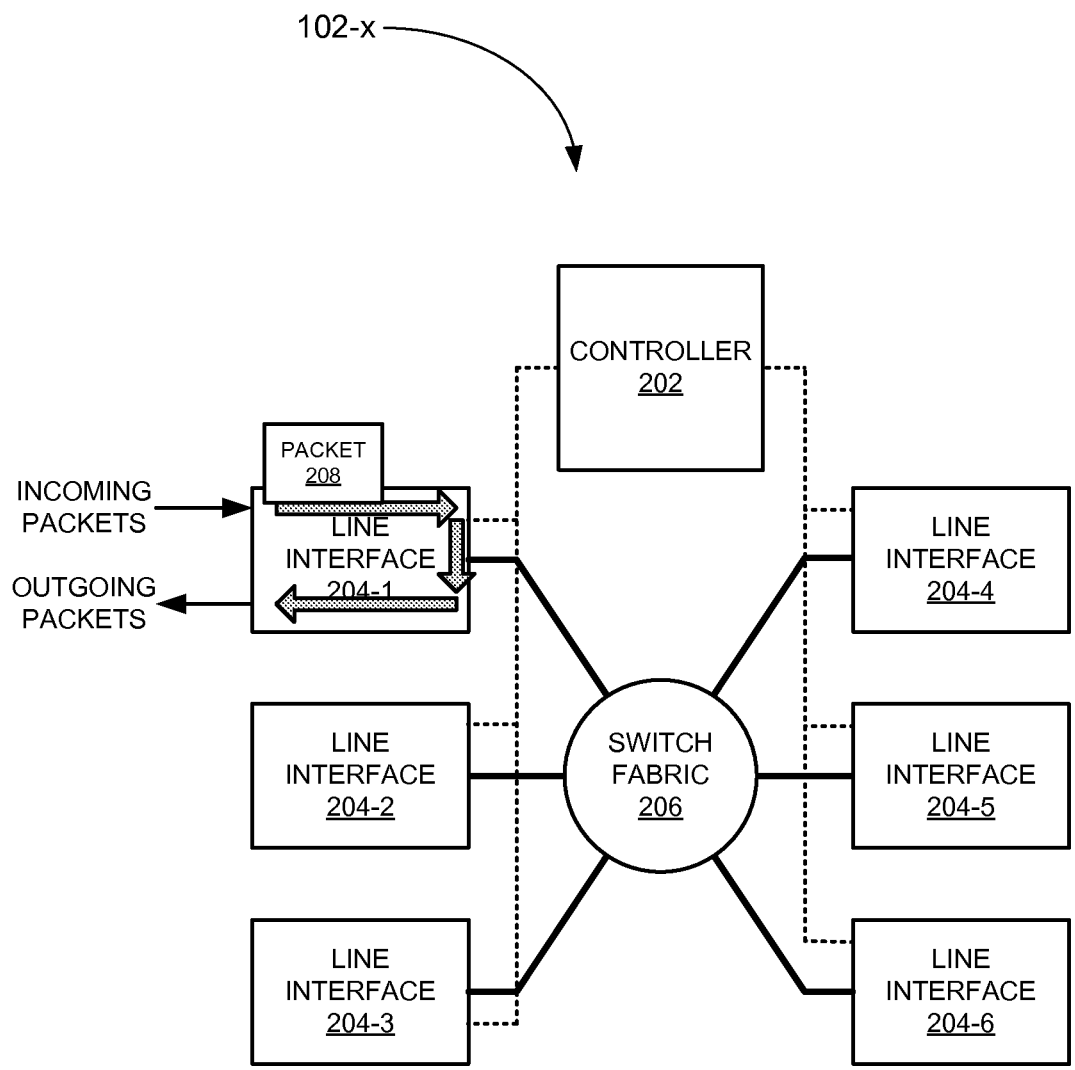

In FIG. 2A, each of line interfaces 204 may act as an ingress line interface and/or an egress line interface. Thus, each one of line interfaces 204 may receive packets from the external network, or forward packets received from switch fabric 206 towards destinations in network 100. FIGS. 2B, 2C and 2D illustrate examples of line interfaces 204 forwarding a packet and acting as ingress or egress line interfaces. In the example of FIG. 2B, a packet 208 may be received at line interface 204-2 from network 100, forwarded to line interface 204-4 via switch fabric 206, and sent toward its destination in network 100 from line interface 204-4. In the example of FIG. 2C, a packet 208 may be received at a line interface 204-6 from network 100, forwarded to line interface 204-1 via switch fabric 206, and sent to its destination in network 100 from line interface 204-1. In the example of FIG. 2D, packet 208 may be received at line interface 204-1 from network 100 and sent towards its destination in network 100 by line interface 204-1.

Figure 3:
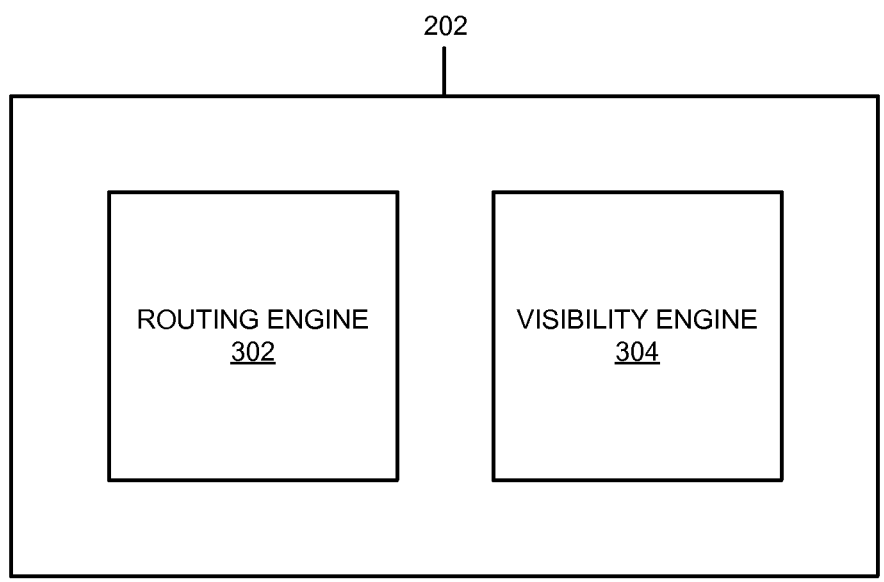
FIG. 3 is a functional block diagram of an exemplary controller of FIG. 2A.

FIG. 3 is a functional block diagram of controller 202. As shown, controller 202 may include a routing engine 302 and a visibility engine 304. Depending on implementation, controller 202 may include additional, fewer, and/or different functional components than those illustrated in FIG. 3. For example, controller 202 may include additional visibility engines 304.

Routing engine 302 may include hardware and/or software for communicating with other routers/switches to gather and store routing/switching information. Visibility engine 304 may include one or more devices for performing traffic analysis. Visibility engine 304 may receive sample packets from line interfaces 204, process/analyze the samples (e.g., identify applications that send or are to receive the sampled packets, such as web servers, browsers, instant messaging clients, file transfer protocol (FTP) clients, etc.), and/or send the processed samples to line interfaces 204.

Visibility engine 304 may use some of the samples for packet inspection. The packet inspection may entail examining packets for non-compliance with communication protocols, security violations (e.g., virus, intrusion, etc.), and/or features that warrant further statistical analysis. In addition, visibility engine 304 may import processed flow statistics from line interfaces 204.

Figure 4:
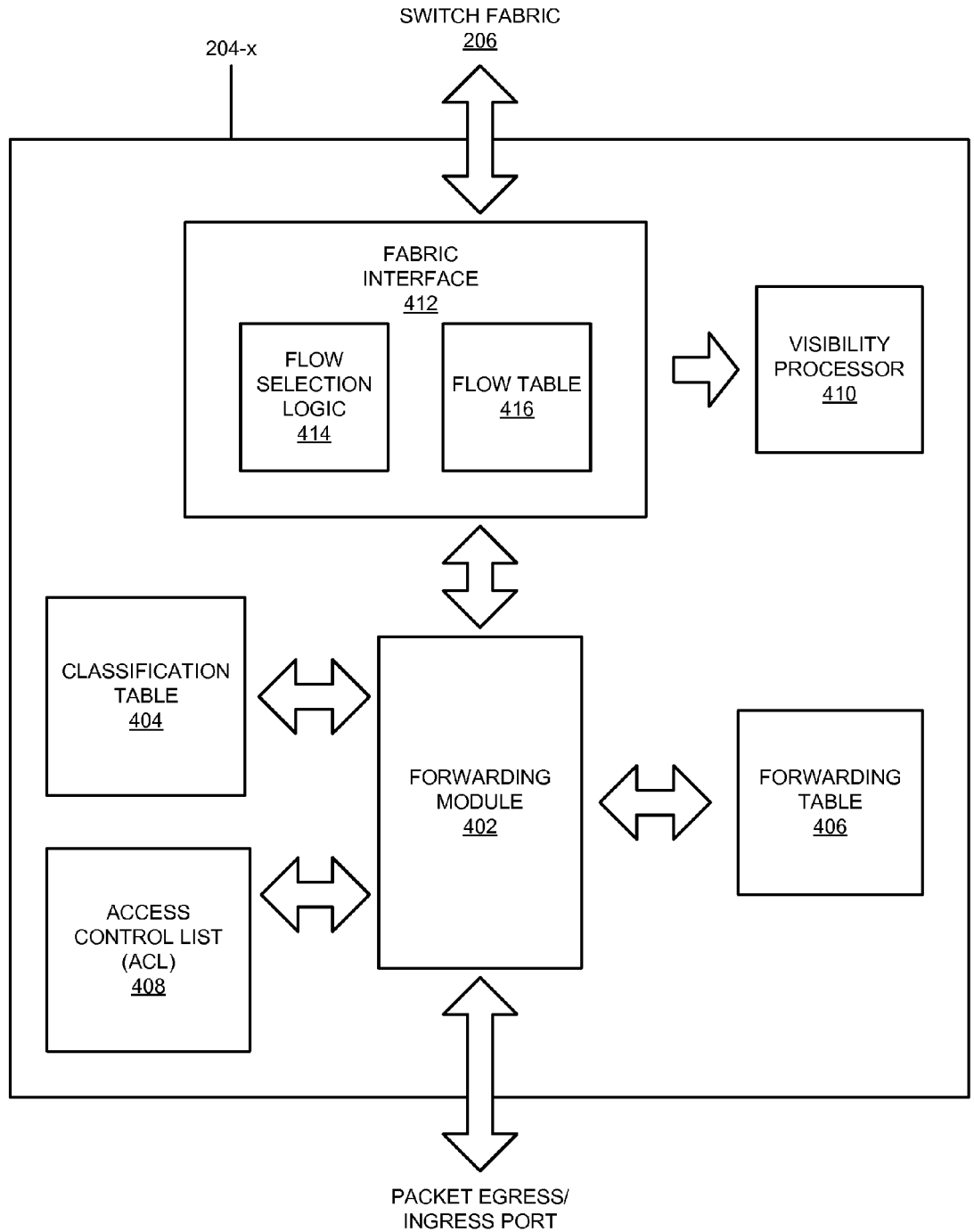

FIG. 4 is a functional block diagram of an exemplary line interface 204-*x*. As shown, line interface 204-*x* may include a forwarding module 402, a classification table 404, a forwarding table 406, an access control list (ACL) 408, a visibility processor 410, and a fabric interface 412. Depending on implementation, line interface 204-*x* may include fewer, additional, or different elements than those illustrated in FIG. 4.

Forwarding module 402 may include hardware and/or software for forwarding and/or classifying a packet that is received at line interface 204-*x*. Forwarding module 402 may perform a lookup in classification table 404, forwarding table 406, and/or ACL 408, and may obtain a packet descriptor that includes a forwarding address (e.g., a destination switch fabric port, a destination network port, etc.). In addition, forwarding module 402 may augment the packet by pre-pending the packet descriptor to the packet, and forward the original packet or the augmented packet to one of line interfaces 204.

Classification table 404 may include rules for categorizing a packet based on a packet header. Examples of classification rules may include rules for performing an ACL lookup (e.g., if a field in a packet header is one of specified values, perform a lookup in ACL 408), for performing a policy based routing (e.g., if a packet header is a telephony packet, route the packet from X to Y via an asynchronous transfer mode (ATM) circuit), and for rendering differentiated quality of service (QoS). In addition, classification table 404 may include parameters that are related to selecting a flow associated with a packet.

Forwarding table 406 may include information for identifying an egress line interface to forward an incoming packet to a network node based on the packet's network destination address. ACL 408 may include a list of rules that detail services or service ports that are available on network device 102-*x*.

Visibility processor 410 may include hardware and/or software for managing flow records and correlating the flow records with sample packets from visibility engine 304 of controller 202. In managing flow records, visibility processor 410 may receive flow statistics from fabric interface 412, aggregate and/or maintain the flow statistics in records of a table, and export the aggregated flow statistics to another component in network device 102-*x* (e.g., visibility engine 304), or alternatively, to a network element that is external to network device 102-*x*.

Fabric interface 412 may include hardware and/or software for providing an interface to switch fabric 206, for sampling packets, and for managing the sampled packets and/or flow statistics. Fabric interface 412 may include one or more interfacing buffers (not shown) for temporarily storing augmented packets (e.g., packets pre-pended with additional header information) from forwarding module 402. The buffers may prevent the packets from being dropped if a bottleneck (e.g., a processing delay) develops on a line interface-to-line interface path during packet transport.

As further shown in FIG. 4, fabric interface 412 may include flow selection logic 414 and a flow table 416. Flow selection logic 414 may include hardware and/or software for sampling flows. Depending on control settings, flow selection logic 414 may determine whether to sample a flow based on a random method. Once the flow is selected for sampling, packets from the flow may be sampled.

In making a selection of one or more flows based on the random method, a threshold value obtained based on a class of a first packet of a flow may be compared to a pseudorandom number. If the pseudorandom number is less than the threshold value, a hash that is computed by applying a hash function to a header of the first packet may be compared to a selected bit sequence. If the computed hash value of the first packet header matches the selected bit sequence, then that flow may be selected for sampling.

In the above, the hash function may be chosen to increase the probability of selecting two or more related flows (e.g., a bidirectional flow). More specifically, a symmetric hash function may be chosen as the hash function. As indicated above, applying a symmetric hash function to a number obtained by concatenating the source and destination addresses of a packet may yield the same hash as applying the hash function to a number obtained by concatenating the destination and source addresses (e.g., the hash is symmetric with respect to the destination address and the source address).

To see how a symmetric hash function may be used, consider the following example in which a first packet arrives at line interface 204-1; a second packet arrives at line interface 204-5; source and destination addresses of the first packet correspond to destination and source addresses of the second packet, respectively; and a selected bit sequence is the same for flow selection logic 414 in both line interfaces 204-1 and 204-5. Assume that, at line interface 204-1, a flow is selected for sampling based on a match between a symmetric hash of the first packet's header and the selected bit sequence.

In the above, applying the symmetric hash function to the header of the second packet at line interface 204-5 may yield the same symmetric hash as the first packet. The same symmetric hash may match the selected bit sequence, and therefore, the reverse flow, to which the second packet belongs, may be selected by flow selection logic 414 in line interface 204-5.

In brief, if a flow is selected for sampling based on a packet, the reverse flow may also be selected based on another packet that belongs to the reverse flow, provided the selected bit sequence is held the same for flow selection logic 414 in line interfaces 204, and the same symmetric hash function is used in flow selection logic 414 in line interfaces 204. The selections of the flow and its reverse flow (e.g., the bidirectional flow) may occur at flow selection logic 414 in different line interfaces, and may or may not occur at different moments.

After a flow is selected for sampling, packets that belong to the flow may be sampled and sent to different components, such as visibility engine 304. If there are multiple visibility engines, the packets may be sent to different visibility engines for load balancing. In these situations, one or more visibility engines may be selected to receive sample packets based on predetermined bits in the hash that was used to select the flow. For example, if the predetermined four bits of a hash have the value "1 0 0 1" and there are $2^4=16$ visibility engines within network device 102-*x*, sampled packets that belong to the flow may be send to $9^{th}$ visibility engine, as binary number "1 0 0 1" is equivalent to decimal number 9.

In the preceding, because the symmetric hashes function is uniformly distributed, the sample packets may also be evenly distributed among different visibility engines. In addition, because packets that belong to a bidirectional flow have the same symmetric hash, such packets may be sent to the same visibility engine. If visibility engine 304 were to perform analysis based on packets that belong to a flow, visibility engine 304 may not need to query other visibility to engines to obtain information about packets that belong to the reverse flow, as the information may be locally available.

Returning to FIG. 4, flow table 416 may provide a table for creating, managing, and/or deleting records of flow statistics.

Figure 5A:
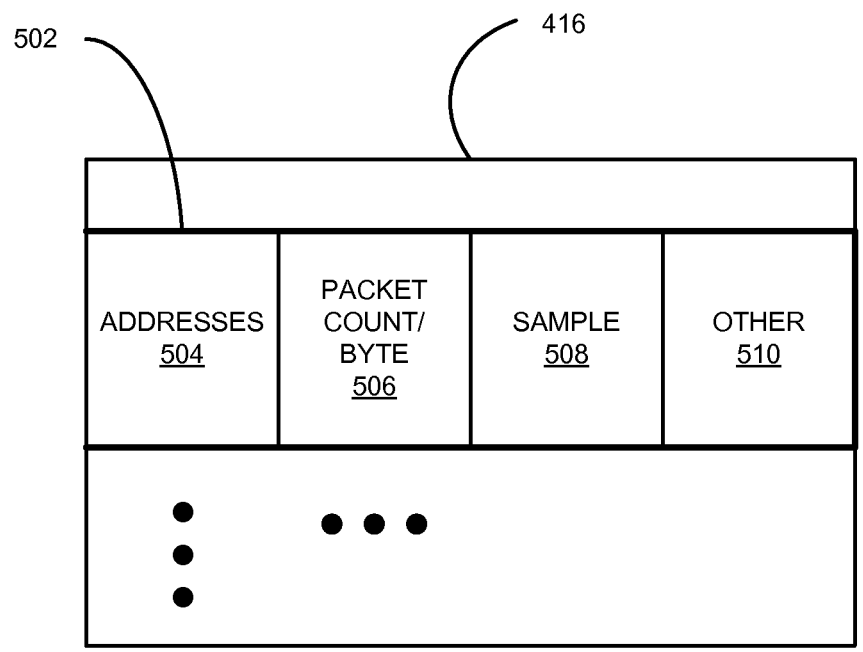
FIG. 5A is a block diagram of an exemplary flow table of FIG. 4.

FIG. 5A is a block diagram of flow table 416. In different implementations, flow table 416 may be included in (e.g., records of flow statistics are created, managed, deleted, etc.) another component, such as forwarding module 402. In other implementations, flow table 416 may be placed in any position between switch fabric 206 and a point at which forwarding lookup/processing occurs.

As shown in FIG. 5A, flow table 416 may include records of flow statistics. Each record 502 may include an address field 504, a packet count/byte field 506, a sample field 508, and other fields 510. In other implementations, flow record 502 may include additional, fewer, or different fields. For example, flow table 416 may include a time stamp field for indicating a time of creation of flow record 502.

Addresses fields 504 may contain source and destination addresses (e.g., IP address, port number, etc.) that are associated with a flow. Packet count/byte fields 506 may indicate the number of packets (e.g., packets) and bytes that have been transferred by the flow. In automated management of flow table 416, packet/byte fields 506 can be used to ensure sampling and delivery of the first N packets to visibility engine 304, by comparing the contents of packet count/byte fields 506 to N, which may be obtained through a classification and/or lookup in different tables/records (e.g., classification table 404, ACL 408, etc.).

Sample field 508 may include a bit value that indicates if packets pertaining to the flow are to be sampled. In a different implementation, sample field 508 may contain a target sample size (e.g., the desired number of samples). Other fields 510 may include fields for storing other types of information, such as an age of a flow, a protocol associated with the flow, etc.

Figure 5B:
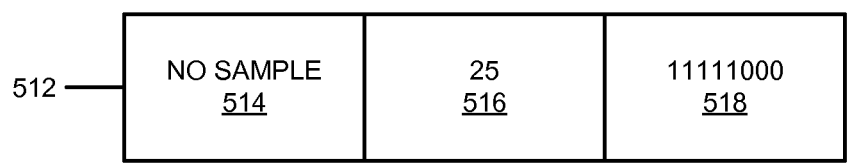
FIG. 5B is a block diagram of a record that includes information obtained by performing a classification/lookup.

FIG. 5B shows a block diagram of a record 512 that includes information obtained by performing a classification of a packet and looking up information based on the class of the packet (e.g., an ACL lookup). Record 512 is shown for illustrative purposes, and, depending on implementation, the information from the classification/lookup may or may not actually be aggregated as shown in record 512. The names of and values in various fields in record 512 are also for illustrative purposes, and may or may not correspond to names (e.g., names of variables, class members, etc.) or values in a specific implementation. In addition, in a specific implementation, additional fields may be present. Also, in some implementations, the information in record 512 may be obtained by performing an ACL lookup.

As shown, record 512 may include flow selection field 514, threshold field 516, and bit mask field 518. Flow selection field 514 may indicate whether a flow may be randomly selected for sampling. For example, in FIG. 5B, flow selection field 514 has the value "NO SAMPLE," which may indicate that the flow may not be selected for sampling based on the random method. Threshold field 516 may indicate a value that may be compared to a random number in determining whether a flow may be selected. In FIG. 5B, threshold field 516 is shown as having the value "25." Bit mask field 518 may show a bit mask that is used during the comparison of a hash and a number to determine if the flow is to be selected in the random method. In FIG. 5B, bit mask field 518 is shown as "1 1 1 1 1 0 0 0."

Exemplary Process for Sampling Flows

Figure 6A:
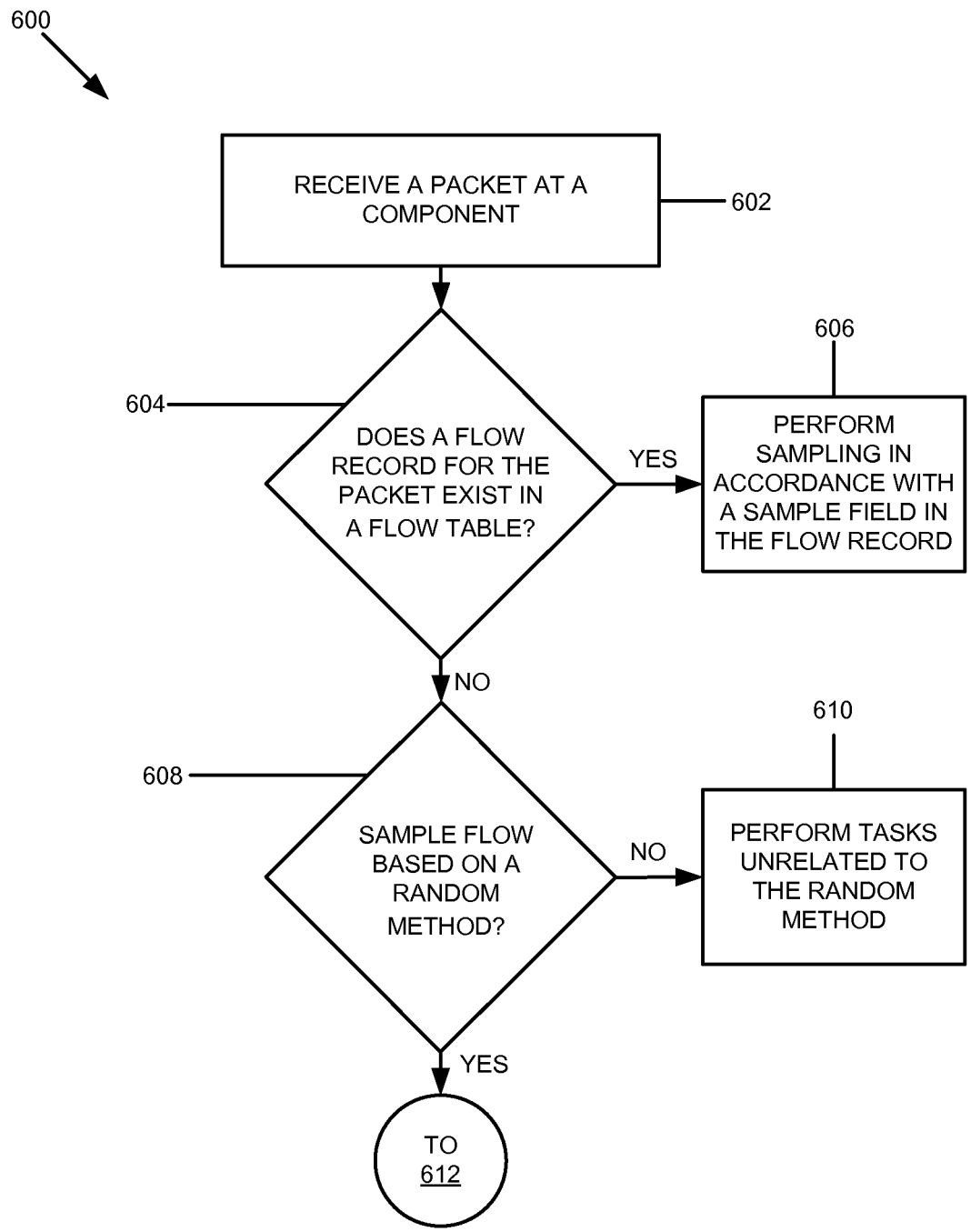
FIGS. 6A and 6B are flow diagrams of an exemplary process for sampling flows.
Figure 6B:
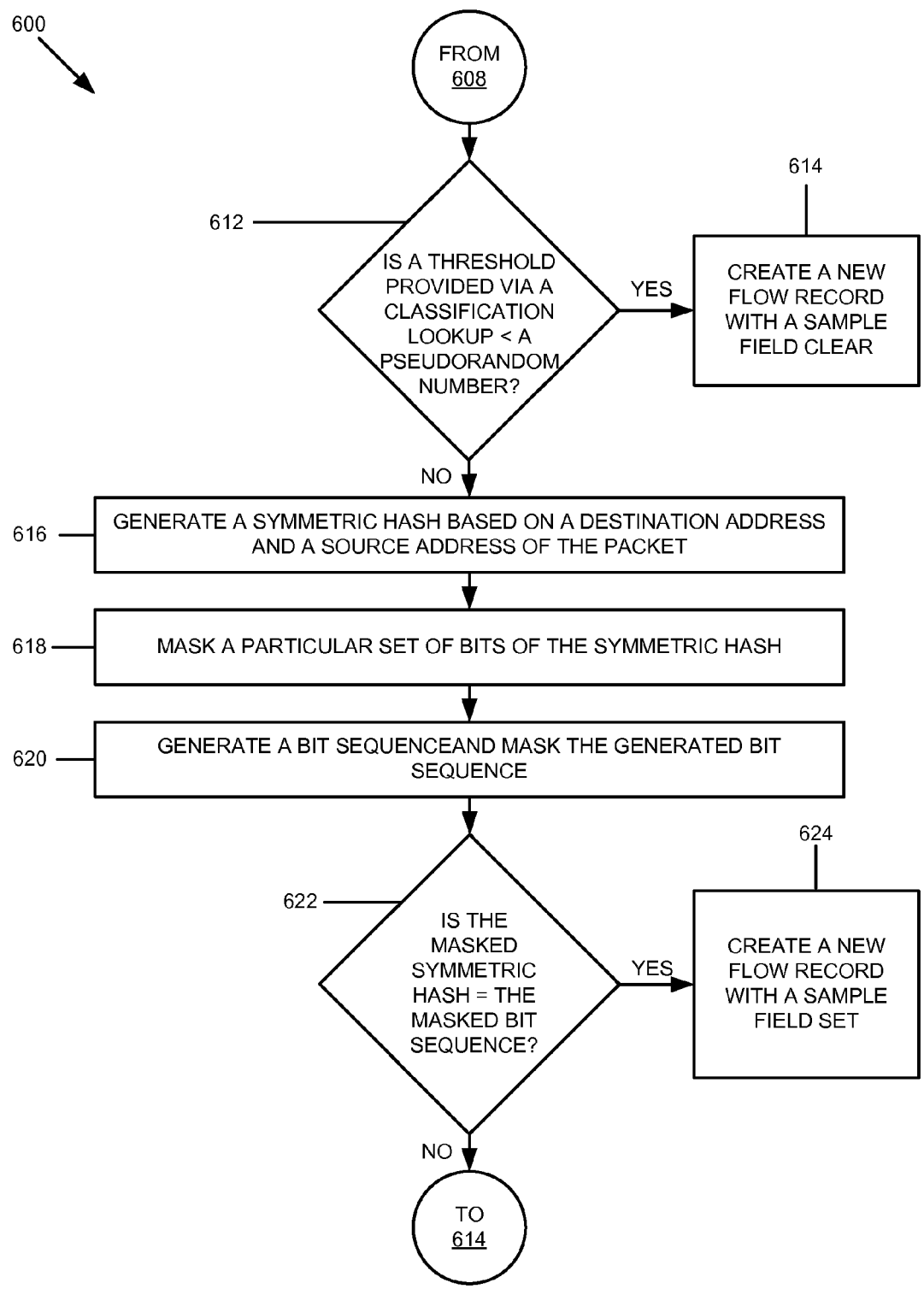

The above paragraphs describe system elements that are related to devices and/or components for sampling flows. FIGS. 6A and 6B illustrate flow diagrams of an exemplary process 600 that is capable of being performed by one or more of these devices and/or components.

FIGS. 6A and 6B are flow diagrams of an exemplary process 600 for sampling a flow. Assume that forwarding module 402 has performed a classification/lookup for a packet, and information which has been retrieved from the classification/lookup is stored in a record, hereafter referred to as a classification lookup record, and/or in a header that has been prepended to the packet by forwarding module 402. The classification lookup record may be similar to record 512 and may include flow selection field 514, threshold field 516, and bit mask field 518, as described above with reference to FIG. 5B.

The exemplary process may begin at block 602, where a packet may be received at flow selection logic 414 (block 602).

It may be determined whether a flow record for the packet exists in flow table 416 (block 604). If the flow record exists, the packet may be sampled in accordance with the value of sample field 508 in flow record 502 (block 606) (e.g., if the value in sample field 508 is "0," the packet may not be sampled). Otherwise, process 600 may proceed to block 608.

It may be determined whether a flow associated with the packet may be sampled based on a random method (block 608). For example, if flow selection field 514 of the classification lookup record includes the value "NO SAMPLE," the flow may not be selected for sampling based on the random method.

If the flow is not to be sampled based on the random method, process 600 may proceed to block 610, at which one or more tasks unrelated to the random method may be performed (block 610). For example, a new flow record may be created, or the packet may be sampled, etc. Otherwise, process 600 may proceed to block 612.

Briefly, blocks 612 through 624 may be involved with sampling one or more flows based on the random method. In particular, a flow may be selected for sampling based on a symmetric hash function. As explained above, the symmetric hash function may map the packet (more specifically, a portion of the packet header) and another packet that belongs to the reverse flow to the same symmetric hash. Therefore, if a flow is selected by comparing the symmetric hash of the packet to a common bit sequence that is shared between different line interfaces, then, when a packet that is associated with the reverse flow arrives at device 102-x, the reverse flow is likely to be selected for sampling. This may increase the probability of obtaining sample packets that are from a bidirectional flow, and therefore, may increase the odds of obtaining useful information for managing the network.

Returning to FIG. 6B, block 612 may start the random selection of a flow, where it may be determined if a threshold that is provided via the classification/lookup is greater than a pseudorandom number (block 612). For example, a value in threshold field 516 of the classification lookup record may be compared to a pseudorandom number. In some implementations, the threshold may affect the rate at which flows are sampled. For example, if the threshold is high, there may be a greater probability that the flow will be sampled. This may translate to greater number of flows being sampled per unit time. Generally, the probability of sampling~threshold/(maximum threshold).

In one implementation, to render flow selection logic 414 more sensitive to computational loads that are associated with packet sampling process, the threshold may be compared to the pseudorandom number after the threshold is modified in accordance with a separate scaling parameter that is indicative of the amount of buffer space occupied by packets in fabric interface 412. For example, if threshold is 128 units, and buffer space is 75% occupied, the threshold may be modified by multiplying the threshold by 0.75. The modified threshold would be 128×0.75=96.

At block 612, if the pseudorandom number is greater than the threshold, the exemplary process may proceed to block 614, where a new flow record associated with the packet may be created (block 614). In the new flow record, sample field 506 may be set to a bit value (e.g., "0") that indicates packets which belong to the flow are not to be sampled. Subsequently, if other packets that belong to the same flow arrive at network device 102-*x*, the arriving packets may not be sampled, in accordance with the value stored in sample field 506.

A symmetric hash may be generated based on a source address and a destination address of the packet (block 616). In one implementation, the symmetric hash may be computed based on a number that is produced by concatenating a source address (e.g., an IP address 191.24.41.3), a destination address (e.g., an IP address 203.43.221.5), and a protocol. In some implementations, a symmetric hash function may be applied to a source address, a source port number, a destination address, and a destination port number, respectively. In other implementations, if the packet is a non-IP packet, the source and destination addresses may include Media Access Control (MAC) addresses and/or related parameters, such as EtherType (e.g., a field in the Ethernet networking standard that indicates what protocol is transported in an Ethernet frame).

Figure 7A:
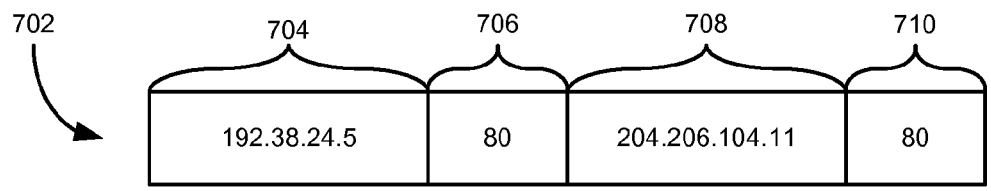
FIG. 7A shows a portion of a packet header.
Figure 7B:
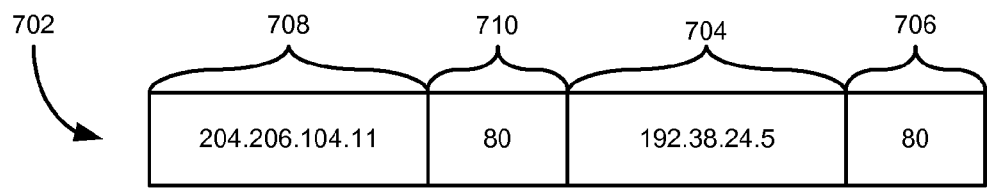
FIG. 7B shows a result of sorting addresses of the packet header of FIG. 7A.

To compute the symmetric hash, the destination address and the source address may be sorted in accordance with descending order of numerical values of the addresses. This is illustrated by FIGS. 7A and 7B. FIG. 7A shows a packet header 702. As shown, packet header 702 may include a source address 704, a source port number 706, a destination address 708, and a destination port number 710. FIG. 7B shows the result of sorting the addresses and port numbers. In FIG. 7B, the positions of source address 704 and source port number 706 are exchanged with the positions of destination address 708 and destination port number 710. In a different configuration of network device 102-*x*, the destination address and the source address may be sorted in accordance with ascending order of numerical values of the addresses, in lieu of the descending order.

Once the addresses are sorted, a hash function (e.g., m mod k, where m is an input value and k is a predetermined integer) may be applied to the sorted addresses, port numbers, and/or protocol to produce a hash. The hash function may have the property that, given different input values, its output values are uniformly distributed over a given range.

In a different implementation, it may be possible to select more than two related flows (e.g., three flows) for sampling. However, in place of the symmetric hash function, a hash function that maps addresses of all of the related flows to the same value may be used. Such a hash function may be uniformly distributed.

Figure 7C:
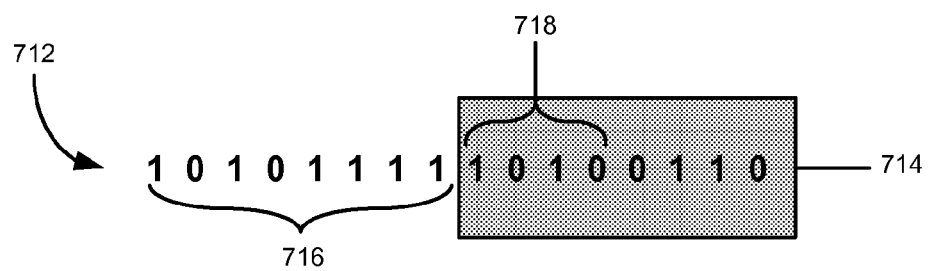
FIG. 7C illustrates masking a symmetric hash.

A particular set of bits of the symmetric hash may be masked (block 618). In one implementation, a bit mask for masking the bits in the symmetric hash may be provided via the classification/lookup (e.g., a value stored in bit mask field 518 in the classification lookup record). FIG. 7C illustrates masking a symmetric hash 712. As shown, symmetric hash 712 may be masked by a bit mask 714, leaving remaining bits 716. A portion of masked bits may include visibility engine selection bits 718, which will be explained in greater detail below.

A bit sequence may be generated and masked (block 620). In one implementation, in a single pass through the random method as shown by the blocks of FIG. 6B, a random bit sequence can be used to select a flow. Over multiple passes through the random method, however, it may be desirable to sample flows that belong to many possible values of the symmetric hash function. To accomplish the preceding, the bit sequence may be taken from a stored value that is incremented after a certain time period or after certain number of flows have been selected for sampling. The stored value may start at any number (e.g., 0), and may rotate through all possible bit sequences to ensure that all different types of flows can be selected. In different implementations, the bit sequence may be set manually or via a random number generator.

Figure 7D:
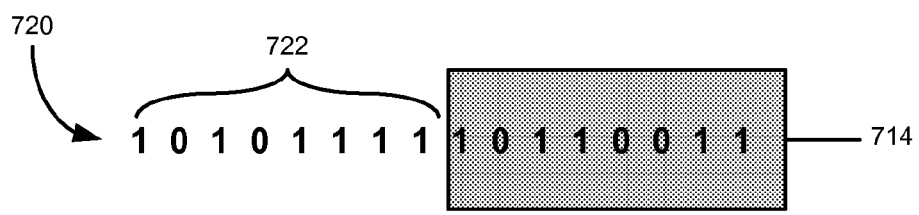
FIG. 7D illustrates masking a bit sequence.

In masking the bit sequence mentioned above, the bit mask that is used in block 618 for the symmetric hash may be used. FIG. 7D illustrates masking a bit sequence 720. As shown, bit sequence 720 may be masked with bit mask 714, leaving remaining bits 722.

It may be determined if the masked symmetric hash is equal to the masked bit sequence (block 622). For example, remaining bits 716, which is a masked symmetric hash, may be compared to remaining bits 722, which is a masked bit sequence. If they are not equal, the flow associated with the packet may not be selected for sampling, and the exemplary process may proceed to block 614. If they are equal, the flow may be selected for sampling, and the exemplary process may proceed to block 624.

In blocks 618-622, one reason for masking the symmetric hash and the bit sequence prior to comparing the symmetric hash and the bit sequence may be to emulate a variable size hash/bit sequence that can modify probabilities of selecting a particular flow. For example, suppose each of a symmetric hash and a bit sequence is 2-bytes long. The probability of the symmetric hash matching the bit sequence may be about $1/2^{16}=1/65,536$. If the leftmost byte of the symmetric hash and the bit sequence are masked out, the probability of the match may be about $1/2^8=1/256$. Therefore, by varying the number of bits that are masked in the symmetric hash and the bit sequence, the probability of obtaining a match may be modified.

To illustrate more specifically how the probabilities of selecting flows (e.g., a bidirectional flow) may be affected by symmetric hashing/masking, assume that the probability of randomly sampling a flow is P, such that P×Number of flows entering device 102-*x*/second=number of flows per second that can be processed by visibility engine 304. If sampling packets on different line interfaces 204 are independent events, the probability of sampling packets of a bidirectional flow via different line interfaces may be given by P·P. Assuming P=0.04, this gives (0.04) (0.04)=0.0016=0.16% of sampling the bidirectional flow.

In contrast, if symmetric hashing and masking are applied, then, the probability of sampling packets in a flow is given by $P·2^N$, where N is the number of unmasked bits. The probability of sampling a bidirectional flow may be obtained from the probability of sampling a flow and a reverse flow at different line cards. The probability may be given by $(P·2^N) (P·2^N)= (P·P) (2^{2N})$. Assuming that P=0.04 and N=4, this gives $(0.04·0.04) (2^8)=0.0016 \times 256=0.4096=40.96\%$. In the example, by using the symmetric hashing/masking, the probability of sampling the bidirectional flow may be increased from 0.16% to 40.96%.

In a different configuration, the length of the bit mask may be set based on various factors. For example, by increasing the size of the bit mask, the rate at which flows and/or packets are sampled may be increased, and therefore, may affect a processing burden on device 102-x. In another example, decreasing the size of the bit mask may increase the time that it takes for the bit sequence to rotate through all possible values (see the description of block 620 regarding the bit sequence). This may increase the time for device 102-x to obtain good representative samples of different flows.

A flow record may be created (block 624). In the new flow record, sample field 506 may be set to a bit value that indicates packets that belong to the flow are to be sampled.

In the exemplary process, when a flow is selected for sampling based on the random method, a destination component (e.g., visibility engine 304, controller 202, etc.) for sample packets may be specified. In one implementation, the destination components may be specified in accordance with visibility engine selection bits 718 (FIG. 7C) in symmetric hash 712. For example, if there are 16 visibility engines in network device 102-x and visibility engine selection bits 718 happen to be "1010," each of packets that belong to the flow may be sampled and sent to the visibility engine designated by "1010," which is visibility engine #10. Such a scheme may provide load balancing. In some implementations, visibility engine selection bits 718 may not directly designate one or more visibility engines, but specify a table or an index into a table that allows network device 102-x to select visibility engines for the samples.

In the preceding, because the symmetric hashes (e.g., symmetric hash 712) are uniformly distributed, the sample packets may also be evenly distributed among different visibility engines. In addition, because packets that belong to a bidirectional flow have the same symmetric hash, such packets may be sent to the same visibility engine. If visibility engine 304 were to perform analysis based on packets that belong to a flow, visibility engine 304 may not need to query other visibility to engines to obtain information about packets that belong to the reverse flow, as the information may be locally available.

EXAMPLE

The following example, with reference to FIG. 8A through 8G, illustrates selecting a flow. The example is consistent with exemplary process 600 described above with reference to FIGS. 6A and 6B.

Figure 8A:
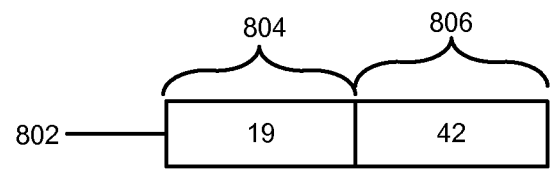
FIG. 8A shows a portion of an exemplary packet header.
Figure 8B:
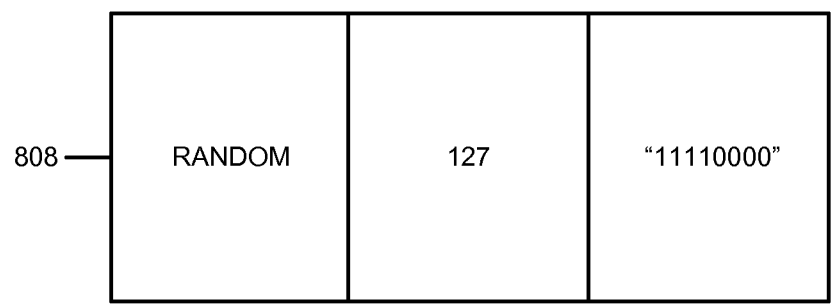
FIG. 8B shows information provided by performing a classification/lookup.

In the example, assume that a packet is received at line interface 204-x, and the packet includes a portion of header 802 as illustrated in FIG. 8A, with source address 804 and destination address 806. In addition, assume that a classification/lookup results in a classification lookup record 808 as illustrated in FIG. 8B. As shown, classification lookup record 808 includes "RANDOM" value for flow selection field 514, indicating that a flow is to be based on the random method; 127 for threshold field 516, indicating that for the flow to be selected for sampling, a pseudorandom number has to be less than 127 (see block 616 in FIG. 6B); and '11110000" for bit mask field 518, indicating the value of a bit mask that is to be applied to a symmetric hash and a bit sequence.

When the packet arrives, flow selection logic 414 determines a flow is to be selected for sampling based on the random method, as indicated by a "RANDOM" value in flow selection field 514 of classification lookup record 808.

Flow selection logic 414 generates a pseudorandom number of 123 and compares 123 against the threshold of 127, which is provided by threshold field 516. The pseudorandom number is less than the threshold (e.g., 123<127), and therefore, flow selection logic 414 proceeds to generate a symmetric hash for the packet.

Figure 8C:
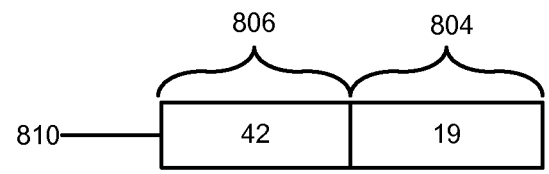
FIG. 8C shows a result of sorting addresses of the packet header of FIG. 8A.

To generate the symmetric hash, flow selection logic 414 sorts source address 804 and destination address 806 according to the numerical values of the addresses. FIG. 8C illustrates the result of sorting source address 804 and destination address 806 of packet 802. As shown, positions of source address 804 and destination address 806 in FIG. 8A are switched in FIG. 8C, such that the numerical values of the addresses (e.g., 42 and 19) are in descending order.

To complete the generation of the symmetric hash, flow selection logic 414 inputs the sorted addresses into a hash function. FIG. 8D shows the hash function 812. As shown, hash function 812 is defined by H(k)=k mod 251. Flow selection logic 414 may set k to a numerical value of the sorted addresses. In this example, the numerical value of the sorted addresses is given by: $42 \times 2^8 + 19 = 10771$. If k is set to 10771, hash function 812 yields 229, as shown in FIG. 8E. In a binary form (e.g., as a bit sequence), 229 may be equivalent to "1 1 1 0 0 1 0 1."

Flow selection logic 414 obtains the symmetric hash, and masks the symmetric hash with the masking bits that are provided by bit mask field 518 of classification lookup record 808. As mentioned above, bit mask field 518 has the value of "1 1 1 1 0 0 0 0," indicating the last four bits of the symmetric hash may be masked out. FIG. 8F shows masking the symmetric hash "1 1 1 0 0 1 0 1" 816 with a bit mask 818. As shown, masking out the last four bits of symmetric hash 816 leaves remaining bits 820.

Flow selection logic 414 generates a bit sequence of "1 1 1 0 0 1 1 0" and masks the bit sequence with the same bit mask that is used to mask symmetric hash 816. FIG. 8G shows masking the bit sequence. "1 1 1 0 0 1 1 0" 824 with bit mask 818. As shown, masking out the last four bits of bit sequence 824 leaves remaining bits 826.

Flow selection logic 414 compares remaining bits 820 to remaining bits 826, and finds them to have the same value. Consequently, flow selection logic 414 concludes that the flow associated with packet 802 is to be sampled. A flow record is created for the flow, with sample field 508 of the flow record set to a value that indicates packets that belong to the flow are to be sampled. Subsequently, any arriving packet that belongs to the flow may be sampled. Furthermore, the sampled packets may be sent to different visibility engines, as designated by the visibility engine selection bits 822.

In the above example, network device 102-x selects a flow that passes through network device 102-x based on the random method. When a packet arrives at network device 102-x, a classification/lookup is performed for the packet. In addition, network device 102-x selects a flow for the packet based on the classification/lookup and the symmetric hash function, and creates flow records for the flow.

Furthermore, in device 102-x, at different line interfaces 204, because the same symmetric hash function is used and the symmetric hashes are compared to the same bit sequence across the different line interfaces 204, the chances of selecting a bidirectional flow and sampling packets that belong to the bidirectional flow may be enhanced. Such samples may provide more useful information than packets

CONCLUSION

The foregoing description of implementations provides illustration, but is not intended to be exhaustive or to limit the implementations to the precise form disclosed. Modifications and variations are possible in light of the above teachings or may be acquired from practice of the teachings.

For example, while series of blocks have been described with regard to exemplary processes illustrated in FIGS. 6A and 6B, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the implementations described herein unless explicitly described as such. Also, as used herein, the article "a" is intended to include one or more items. Where one item is intended, the term "one" or similar language is used. Further, the phrase "based on" is intended to mean "based, at least in part, on" unless explicitly stated otherwise.

What is claimed is:

1. A method comprising:
   generating, by a network device, a hash based on a header of a packet;
   masking, by the network device and based on a bit mask, bits of the hash to obtain a first bit sequence;
   masking, by the network device and based on the bit mask, bits of a stored value to obtain a second bit sequence;
   selecting, by the network device and based on the first bit sequence and the second bit sequence, a flow for sampling; and
   sampling, by the network device and based on a flow record associated with the flow, a plurality of packets.

2. The method of claim 1, further comprising:
   determining a classification associated with the packet; and
   obtaining, based on the classification of the packet, the bit mask.

3. The method of claim 1, further comprising:
   modifying the stored value;
   selecting, based on the modified stored value, a different flow; and
   sampling, based on another flow record associated with the different flow, another plurality of packets.

4. The method of claim 1, further comprising:
   sending, based on a subset of the bits of the hash, the sampled plurality of packets to a device for obtaining information from the sampled plurality of abets.

5. The method of claim 1, further comprising:
   inspecting the sampled plurality of packets to identify at least one of:
   a security violation, or
   an application associated with a transmission of the plurality of packets to the network device.

6. The method of claim 1, further comprising:
   receiving the packet from another network device;
   determining, based on receiving the packet, whether a flow record is associated with the packet; and
   determining, when a flow record is not associated with the packet, that a flow associated with the packet is to be sampled randomly.

7. The method of claim 1, where generating the hash includes:
   generating the hash based on one or more addresses in the header of the packet.

8. A method comprising:
   determining, by a network device, that a flow record is not associated with a received packet;
   determining, by the network device and based on the flow record not being associated with the packet, that a flow associated with the packet is to be sampled randomly;
   sorting, by the network device and based on determining that the flow is to be randomly sampled, a destination address and a source address, of the packet, to arrange the destination address and the source address in descending order of numerical values associated with the destination address and the source address;
   generating, by the network device, a hash based on the sorted destination address and the sorted source address;
   selecting, by the network device, a flow for sampling when the hash matches a value in a memory associated with the network device; and
   sampling, by the network device and based on a flow record associated with the flow, a plurality of packets associated with the flow.

9. The method of claim 8, further comprising:
   determining, based on a classification associated with the packet, whether a threshold value, associated with storage of packets in a memory of the network device, is less than a pseudorandom number, and
   where the destination address and the source address are sorted and the hash is generated when the threshold value is less than the pseudorandom number.

10. The method of claim 9, further comprising:
    setting the threshold value based on an amount of a buffer being used to store packets received by the network device.

11. The method of claim 8, where selecting the flow for sampling includes:
    setting a bit in a sample field in the flow record to indicate that packets associated with the flow are to be sampled.

12. The method of claim 11, where sampling the plurality of packets includes:
    sampling the plurality of packets further based on the bit in the sample field being set.

13. A system comprising:
    a network device, including one or more processors, to:
    determine, based on a classification associated with a received packet, that a threshold value is less than a pseudorandom number;
    sort, based on the threshold value being less than the pseudorandom number, a destination address and a source address, of the packet, to arrange the destination address and the source address in descending order of numerical values of the destination address and the source address,
    generate a hash based on the sorted destination address and the sorted source address,
    select a flow for sampling when the hash matches a value stored in a memory device, and
    sample, based on a flow record associated with the flow, a plurality of packets associated with the flow.

14. The system of claim 13, where the network device is further to:

set the threshold value based on an amount of a buffer being used to store packets received by the network device.

15. The system of claim 13, where the network device is further to:
receive the packet from another network device via a network,
determine, based on receiving the packet, that a flow record is associated with the packet; and
determine, based on the flow record not being associated with the packet, that a flow associated with the packet is to be sampled randomly; and
where, when determining that a threshold value is less than a pseudorandom number, the network device is to:
determine, based on determining that the flow is to be sampled randomly, that the threshold value is less than a pseudorandom number.

16. A network device comprising:
a processor to:
generate a hash based on a header of a packet;
mask, based on a bit mask, bits of the hash to obtain a first bit sequence;
mask, based on the bit mask, bits of a stored value to obtain a second bit sequence;
select, based on the first bit sequence and the second bit sequence, a flow for sampling; and
sample, based on a flow record associated with the flow, a plurality of packets.

17. The device of claim 16, where the processor is further to:
determine a classification associated with the packet; and
obtain, based on the classification of the packet, the bit mask.

18. The device of claim 16, where the processor is further to:
modify the stored value;
select, based on the modified stored value, a different flow; and
sample, based on another flow record associated with the different flow, another plurality of packets.

19. The device of claim 16, where the processor is further to:
send, based on a subset of the bits of the hash, the sampled plurality of packets to a device for obtaining information from the sampled plurality of packets.

20. The device of claim 16, where the processor is further to:
inspect the sampled plurality of packets to identify at least one of:
a security violation, or
an application associated with a transmission of the plurality of packets to the network device.

* * * * *

UNITED STATES PATENT AND TRADEMARK OFFICE
CERTIFICATE OF CORRECTION

| | | |
|---|---|---|
| PATENT NO. | : 8,761,182 B2 | Page 1 of 1 |
| APPLICATION NO. | : 13/098445 | |
| DATED | : June 24, 2014 | |
| INVENTOR(S) | : Jack Kohn et al. | |

It is certified that error appears in the above-identified patent and that said Letters Patent is hereby corrected as shown below:

IN THE CLAIMS:

On claim 4, column 13, line 57, the following should read as follows:

"information from the sampled plurality of packets."

Signed and Sealed this
Thirtieth Day of December, 2014

Michelle K. Lee
*Deputy Director of the United States Patent and Trademark Office*